United States Patent
Neveu et al.

(10) Patent No.: US 10,766,337 B2
(45) Date of Patent: Sep. 8, 2020

(54) CONTROL SYSTEM FOR AIR CONDITIONING SYSTEM OF A MOTOR VEHICLE

(71) Applicant: Valeo Systemes Thermiques, Le Mesnil Saint Denis (FR)

(72) Inventors: Daniel Neveu, Le Mesnil Saint Denis (FR); Gilles Rivet, Le Mesnil Saint Denis (FR); Thierry Elbhar, Le Mesnil Saint Denis (FR); Vincent Feuillard, Le Mesnil Saint Denis (FR); Stefan Karl, Le Mesnil Saint Denis (FR); Didier Barat, Le Mesnil Saint Denis (FR); Josselin Gour, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 300 days.

(21) Appl. No.: 15/748,873

(22) PCT Filed: Jun. 30, 2016

(86) PCT No.: PCT/EP2016/065284
§ 371 (c)(1),
(2) Date: Jan. 30, 2018

(87) PCT Pub. No.: WO2017/016784
PCT Pub. Date: Feb. 2, 2017

(65) Prior Publication Data
US 2018/0215233 A1    Aug. 2, 2018

(30) Foreign Application Priority Data
Jul. 30, 2015    (FR) ..................... 15 57282

(51) Int. Cl.
*B60H 1/00* (2006.01)
*G01J 5/00* (2006.01)
(Continued)

(52) U.S. Cl.
CPC ........ *B60H 1/00742* (2013.01); *G01J 5/0025* (2013.01); *G06K 9/00832* (2013.01);
(Continued)

(58) Field of Classification Search
None
See application file for complete search history.

(56) References Cited

U.S. PATENT DOCUMENTS 6,659,358 B2 * 12/2003 Kamiya ............. B60H 1/00792
                                                        165/204
6,757,009 B1 * 6/2004 Simon .................... B60N 2/002
                                                        348/148
(Continued)

FOREIGN PATENT DOCUMENTS

DE  10 2013 007080 A1   3/2014
JP  2003/341337 A       12/2003
WO  2014/105993 A1      7/2014

OTHER PUBLICATIONS

International Search Report issued in corresponding application No. PCT/EP2016/065284 dated Sep. 8, 2016 (4 pages).
Written Opinion of the International Searching Authority issued in corresponding application No. PCT/EP2016/065284 dated Sep. 8, 2016 (5 pages).

*Primary Examiner* — Lina M Cordero
(74) *Attorney, Agent, or Firm* — Osha Liang LLP

(57) ABSTRACT

The present invention relates to a control system (1) for the heating, ventilation and/or air conditioning system of a motor vehicle, said control system (1) comprising: a first camera (2) sensitive to wavelengths in the mid-infrared spectrum, and a device (5) for processing and analysis of images, capable of performing temperature measurements
(Continued)

on the images of the first camera (2) and of calculating, from said measurements, at least one thermal comfort coefficient of at least one occupant (4) of the motor vehicle, the thermal comfort coefficient being used for regulating the air temperature, the air flow rate and the air distribution within the heating, ventilation and/or air conditioning system, the control system (1) further comprising a second camera (3) sensitive to wavelengths in the visible and/or near-infrared spectra.

13 Claims, 1 Drawing Sheet

(51) Int. Cl.
  *G06K 9/00* (2006.01)
  *H04N 5/33* (2006.01)
(52) U.S. Cl.
  CPC ...... *H04N 5/332* (2013.01); *G01J 2005/0077* (2013.01); *G01J 2005/0085* (2013.01)

(56) References Cited

U.S. PATENT DOCUMENTS

| | | | |
|---|---|---|---|
| 2002/0161501 A1 | 10/2002 | Dulin et al. | |
| 2005/0103876 A1* | 5/2005 | Martinez | B60H 1/00742 236/94 |
| 2005/0267646 A1* | 12/2005 | Ichishi | G05D 23/1928 700/300 |
| 2007/0075246 A1* | 4/2007 | Gatt | G01J 5/0846 250/341.6 |
| 2014/0148706 A1* | 5/2014 | Van Treeck | A61B 5/015 600/474 |
| 2015/0103141 A1* | 4/2015 | Lee | G01J 5/0025 348/43 |
| 2015/0324656 A1* | 11/2015 | Marks | G01J 5/0025 383/103 |
| 2016/0137028 A1* | 5/2016 | Trego | B60H 1/00742 165/203 |

\* cited by examiner

CONTROL SYSTEM FOR AIR CONDITIONING SYSTEM OF A MOTOR VEHICLE

The invention relates to a control system for the heating, ventilation and/or air conditioning installation of a motor vehicle and more particularly the systems comprising at least one temperature sensor.

In fact, it is known to measure the inside temperature of the car interior and the body temperature of the occupant or occupants at different levels in order to compute a thermal comfort coefficient. This thermal comfort coefficient is computed according to a mathematical formula based on the heat perception of a representative panel of the population upon which the body temperature has been measured in different conditions. The computed thermal comfort coefficient is then used for regulating the air temperature, the air flow rate and the air distribution within the heating, ventilation and/or air conditioning installation.

In order to measure these different temperatures, the control system generally comprises an infrared camera which serves as a temperature sensor. However, the infrared camera must have high definition, which involves the use of an expensive infrared camera.

One of the purposes of the present invention is therefore to at least partially overcome the disadvantages of the prior art and to propose a control system allowing the use of a low-definition infrared camera.

The present invention therefore relates to a control system for a heating, ventilation and/or air conditioning installation of a motor vehicle, said control system comprising:
 a first camera sensitive to wavelengths situated in the mid-infrared spectrum, and
 a device for processing and analyzing images capable of carrying out temperature measurements on the images of the first camera and of computing, on the basis of these measurements, at least one thermal comfort coefficient of at least one occupant of the motor vehicle,
 the thermal comfort coefficient being used for regulating the air temperature, the air flow rate and the air distribution within the heating, ventilation and/or air conditioning system,
 the control system comprising moreover a second camera sensitive to wavelengths situated in the visible spectrum and/or in the near-infrared spectrum.

It is then possible, with such a control system, to use a low-definition infrared camera and thus to reduce costs.

According to one aspect of the invention, the processing and analyzing device being capable of spotting noteworthy points for the thermal comfort of the occupant on the images of the second camera and of transferring said noteworthy points onto the images of the first camera, the temperature measurements of the occupant being carried out on these noteworthy points.

The fact of using the images of the second camera for carrying out the spotting of the noteworthy points in order then to transfer them onto the images of the first camera allows the use of a first camera having low definition and therefore less expensive. In fact, in order for it to be possible to discriminate the noteworthy points on the images of a first infrared camera, the latter must be a high-definition camera.

According to another aspect of the invention, the definition of the first camera is lower than the definition of the second camera.

According to another aspect of the invention, the ratio between the definition of the first camera and the definition of the second camera is between 9/4000 and 9/25000.

According to another aspect of the invention, the definition of the first camera is between 60×60 and 150×150 pixels and the definition of the second camera is between 1 and 10 megapixels.

According to another aspect of the invention, the first camera has a definition of 80×80 pixels.

According to another aspect of the invention, the second camera has a definition of 3 megapixels.

According to another aspect of the invention, the first and second cameras have the face of the occupant in their respective field of view.

According to another aspect of the invention, the noteworthy points comprise at least the forehead, the nose and the cheeks of the occupant of the motor vehicle.

According to another aspect of the invention, the noteworthy points also comprise the background of the image and a portion of the clothing of the occupant.

According to another aspect of the invention, the first and second cameras have identical focal lengths.

According to another aspect of the invention, the first and second cameras are positioned side by side.

According to another aspect of the invention, the second camera is also used for other functions of the vehicle necessitating an observation of the interior of the motor vehicle.

According to another aspect of the invention, the first camera is adjusted to capture wavelengths between 3 and 50 µm, and more particularly between 8 and 12 µm.

The present invention also relates to a method for controlling a heating, ventilation and/or air conditioning installation of a motor vehicle comprising a control system such as described above, said method comprising the following steps:
 capture of images in the mid-infrared spectrum by the first camera and capture of images in the visible spectrum and/or near infra-red spectrum by the second camera,
 analysis of the images of the second camera by the device for processing and analysis and spotting of the noteworthy points for the thermal comfort of the occupant,
 transferring by the device for processing and analysis of the noteworthy points onto the images of the first camera and measurement of the temperature at these noteworthy points,
 computation of a thermal comfort coefficient by the device for processing and analysis on the basis of the temperature measurements,
 regulation of the air temperature, of the air flow rate and of the air distribution within the heating, ventilation and/or air conditioning installation as a function of the value of the thermal comfort coefficient.

Other features and advantages of the invention will appear more clearly on reading the following description, given by way of illustrative and non-limiting example, and the appended drawings in which.

Identical elements in the different figures bear the same references.

The following embodiments are examples. Even though the description refers to one or more embodiments, this does not necessarily signify that each reference relates to the same embodiment or that the features apply only to a single embodiment. Simple features of different embodiments can also be combined in order to provide other embodiments.

In the present description it is possible to index certain elements or parameters, such as for example first element or second element as well as first parameter and second parameter or also first criterion and second criterion etc. In this case, it is a matter of simple indexing in order to differentiate and denote similar but not identical elements or parameters. This indexing does not imply priority of one element, parameter or criterion with respect to another and such denominations can easily be interchanged without departing from the context of the present description. This indexing does not moreover imply an order in time for example in order to appreciate such a criterion or such criteria.

Figure 1:
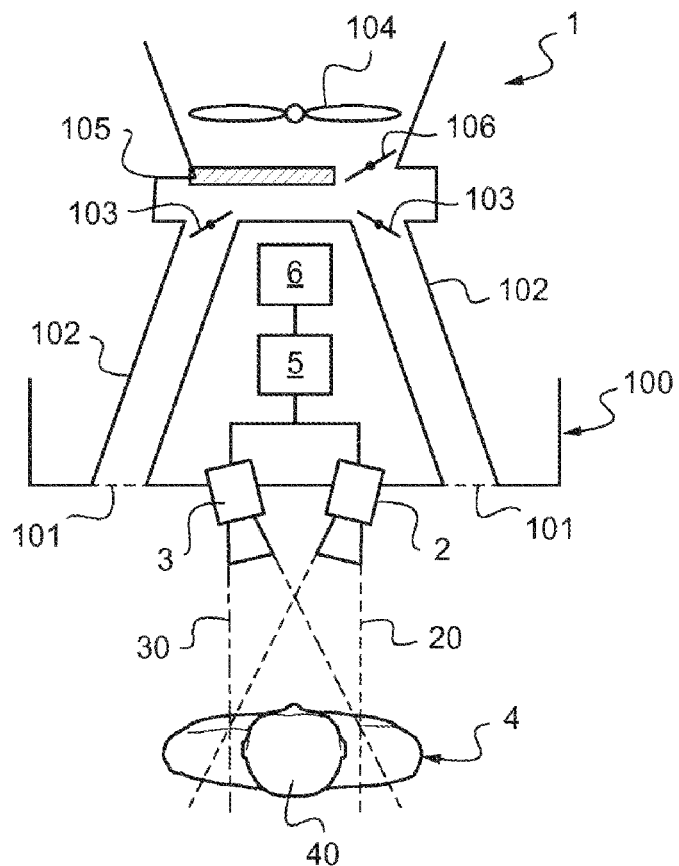
FIG. 1 shows a diagrammatic representation of a control system and of a heating, ventilation and/or air conditioning installation of a motor vehicle.

FIG. 1 shows a control system comprising:
a first camera 2 sensitive to wavelengths situated in the mid-infrared spectrum,
a second camera 3 sensitive to wavelengths situated in the visible spectrum and/or in the near-infrared spectrum, and
a device 5 for processing and analyzing images.

Figure 2:
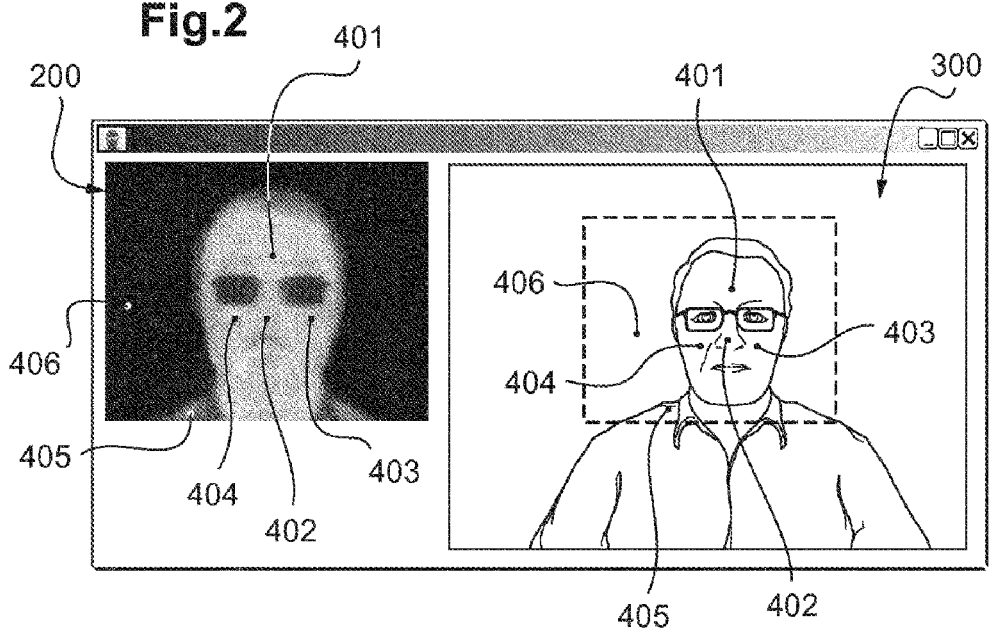
FIG. 2 shows a diagrammatic representation of the images captured by the cameras of the control system.

The processing and analyzing device 5 is capable of spotting noteworthy points 401, 402, 403, 404, 405, 406 for the thermal comfort of at least one occupant 4 of the motor vehicle, on the images 300 of the second camera 3, as well as transferring said noteworthy points 401, 402, 403, 404, 405, 406 onto the images 200 of the first camera 2. On the images 200 of the first camera 2, the processing and analyzing device 5 is capable of measuring the temperature of the occupant 4 of the motor vehicle. These measurements of temperature of the occupant 4 are carried out on the noteworthy points 401, 402, 403, 404, 405, 406 defined on the images 300 of the camera 3 and transferred onto the images 200 of the first camera 2. These images are notably visible in FIG. 2. For a good measurement of the temperature, the first camera 2 is preferably sensitive to wavelengths between 3 and 50 μm, and more particularly between 8 and 12 μm, which correspond to the wavelengths emitted by living organisms.

The definition of the first camera 2 is lower than the definition of the second camera 3. The ratio between the definition of the first camera 2 and the definition of the second camera 3 is preferably between 9/4000 and 9/25000. More particularly, the definition of the first camera 2 is between 60×60 and 150×150 pixels, preferably between 70×70 and 120×120 pixels, and the definition of the second camera 3 is between 1 and 10 megapixels. For example, in the context of the invention, the definition of the first camera 2 can be of the order of 80×80 pixels and the definition of the second camera can be of the order of 3 megapixels. These definition values of the first 2 and second 3 cameras are a good compromise between their definition necessary for carrying out their functions and their costs.

The fact of using the images 300 of the second camera 3 for carrying out the spotting of the noteworthy points 401, 402, 403, 404, 405, 406 in order to then transfer them onto the images 200 of the first camera 2, allows the use of a first camera 2 having low definition and therefore less expensive. In fact, in order for it to be possible to discriminate the noteworthy points on the images 200 of a first infrared camera 2, the latter must have high definition.

The fact that the second camera 3 is sensitive to wavelengths situated in the near-infrared spectrum notably makes it possible to capture an image allowing the spotting of the noteworthy points 401, 402, 403, 404, 405, 406 even in low light or at night.

Les measurements carried out at the level of the noteworthy points 401, 402, 403, 404, 405, 406 are used for regulating the air temperature, the air flow rate and of the air distribution within the heating, ventilation and/or air conditioning installation. This can be carried out by an electronic control device 6 which receives the measurements carried out by the processing and analyzing device 5, and which computes a thermal comfort coefficient on the basis of these measurements. This thermal comfort coefficient is computed according to a mathematical formula based on the measurements of temperatures carried out and on the thermal perception of a representative panel of the population, upon which the body temperature has been measured in different conditions. According to the value of this thermal comfort coefficient, the electronic control device 6 has an effect on the elements of the heating, ventilation and/or air conditioning installation of a motor vehicle (or HVAC) in order to regulate the air temperature, the air flow rate and the air distribution within said heating, ventilation and/or air conditioning installation.

Le electronic control device 6 can thus act upon the orientation, the opening or the closing of the aeration nozzles 101 placed on the board panel 100, or at the rear of the motor vehicle. The electronic control device 6 can also act upon the opening or closing of the closing flaps 103 of the aeration ducts 102, on the switching on or off of an air booster 104, on the switching on of the air conditioning, here represented by its evaporator 105, and of the quantity of air passing through said evaporator 105 via for example a flap 106. The electronic control device 6 can also control other elements of the heating, ventilation and/or air conditioning installation which are not shown, such as an electric heating device or the change from a recycled air circulation mode to a circulation of air coming from the exterior mode.

The noteworthy points preferably comprise at least the forehead 401, the nose 402 and the cheeks 403, 404. These points are considered as noteworthy because they are easily recognizable by the device 5 for processing and analyzing the images 300 of the second camera 3 and also because they correspond to important points for measuring the body temperature of the occupant 4. In fact, the nose 402 is a point where the temperature of the face is low whereas the cheeks 403, 404 and the forehead are large areas where the body temperature is released and is therefore easily measurable. The first 2 and second 3 cameras thus both have the face 40 of the occupant 4 in their respective field of view 20, 30. Moreover, the noteworthy points can also comprise the background 406 of the image and also a portion of the clothing 405 of said occupant 4.

The transfer of the noteworthy points 401, 402, 403, 404, 405, 406 from the image 300 of the second camera 3 onto the image 200 of the first one is done by mathematical computation knowing the position of the first 2 and second 3 cameras with respect to each other and their orientations. In order to limit the distortions between the images coming from the two cameras 2, 3 as well as to limit the complexity of the computations carried out by the processing and analyzing device 5, the first 2 and second 3 cameras are preferably positioned side by side. For the same reasons, the first 2 and second 3 cameras preferably have close or even identical focal lengths.

In order to further limit the production costs, the second camera 3 can also be used for other functions of the vehicle necessitating an observation of the interior of the motor vehicle, such as for example a system for monitoring the drowsiness of the driver.

The present invention therefore also relates to a method for controlling a heating, ventilation and/or air conditioning installation of a motor vehicle comprising a control system 1 such as described above, said method comprising the following steps:

capture of images 200 in the mid-infrared spectrum by the first camera 2 and capture of images 300 in the visible spectrum and/or in the near-infrared spectrum by the second camera 3, analysis of the images 300 of the second camera 3 by the processing and analyzing device 5 and spotting of the noteworthy points 401, 402, 403, 404, 405, 406 for the thermal comfort of the occupant 4, transfer par the processing and analyzing device 5 of the noteworthy points 401, 402, 403, 404, 405, 406 onto the images 200 of the first camera 2 and measurement of the temperature at these noteworthy points 401, 402, 403, 404, 405, 406, computation of a thermal comfort coefficient by the processing and analyzing device 5 on the basis of the measurements of the temperature, and regulation of the air temperature, of the air flow rate and of the air distribution within the heating, ventilation and/or air conditioning installation as a function of the value of the thermal comfort coefficient.

For a thermal comfort coefficient indicating that the occupant 4 is cold, the control system 1 will for example engage the heating of the air to be sent to the car interior until the thermal comfort coefficient indicates a neutral state. In the opposite case, if the thermal comfort coefficient indicates that the occupant 4 is hot, the control system 1 will for example engage the air conditioning and therefore the cooling of the air to be sent to the car interior until the thermal comfort coefficient indicates a neutral state.

The control system 1 can also observe that the thermal comfort coefficient is different according to the right or left side of the occupant 4, for example due to a direct exposure to the sun on one of his sides. In this case, the control system can adjust the temperature of the air as well as its orientation in order to obtain a thermal comfort coefficient value which is identical on each side and indicating a neutral state.

Thus it can easily be seen that, because of the use of two cameras, one in the mid-infrared spectrum and one in the visible and/or near-infrared spectrum, it is possible to measure the temperature and to compute a thermal comfort coefficient at lower cost.

The invention claimed is:

1. A control system for a heating, ventilation and/or air conditioning installation of a motor vehicle, said control system comprising:
a first camera sensitive to wavelengths situated in a mid-infrared spectrum; and
a device for processing and analyzing images of the first camera, the device capable of carrying out temperature measurements on the images of the first camera and of computing, on the basis of the temperature measurements, at least one thermal comfort coefficient of at least one occupant of the motor vehicle,
wherein the at least one thermal comfort coefficient is used for regulating air temperature, air flow rate and air distribution within the heating, ventilation and/or air conditioning installation; and
a second camera sensitive to wavelengths situated in a visible spectrum and/or in a near-infrared spectrum,
wherein the device is capable of spotting features of the at least one occupant on images of the second camera, and of transferring said features onto the images of the first camera, the temperature measurements being carried out on the features.

2. The control system as claimed in claim 1, wherein a definition of the first camera is lower than a definition of the second camera.

3. The control system as claimed in claim 2, wherein a ratio of pixels between the definition of the first camera and the definition of the second camera is between 9/4000 and 9/25000.

4. The control system as claimed in claim 1, wherein a definition of the first camera is between 60×60 pixels and 150×150 pixels and a definition of the second camera is between 1 megapixel and 10 megapixels.

5. The control system as claimed in claim 1, wherein the first camera and the second camera have a face of the at least one occupant in their respective fields of view.

6. The control system as claimed in claim 5, wherein the features comprise at least a forehead, a nose and cheeks of the at least one occupant of the motor vehicle.

7. The control system as claimed in claim 5, wherein the features also comprise a background of the image of the second camera and a portion of clothing of the at least one occupant.

8. The control system as claimed in claim 1, wherein the first camera and the second camera have identical focal lengths.

9. The control system as claimed in claim 1, wherein the first camera and the second camera are positioned side by side.

10. The control system as claimed in claim 1, wherein the second camera is also used for other functions of the motor vehicle necessitating an observation of an interior of the motor vehicle.

11. The control system as claimed in claim 1, wherein the first camera is adjusted to capture wavelengths between 3 µm and 50 µm.

12. A method for controlling a heating, ventilation and/or air conditioning installation of a motor vehicle comprising a control system, the method comprising:
capture of images in a mid-infrared spectrum by a first camera and capture of images in a visible spectrum and/or a near infra-red spectrum by a second camera;
analysis of the images of the second camera by a device for spotting of noteworthy points for computing a thermal comfort coefficient of an occupant;
transferring by the device the noteworthy points onto the images of the first camera and measuring temperature at the noteworthy points;
computation of the thermal comfort coefficient by the device on the basis of the temperature; and
regulation of air temperature, of air flow rate and of air distribution within the heating, ventilation and/or air conditioning installation as a function of a value of the thermal comfort coefficient.

13. The method as claimed in claim 12, wherein the regulation of the air temperature, of the air flow rate and of the air distribution further comprises:
opening or closing, with the device, aeration nozzles of the heating, ventilation and/or air conditioning installation; or
opening or closing, with the device, flaps of aeration ducts of the heating, ventilation and/or air conditioning installation; or
switching on or off, with the device, an air booster of the heating, ventilation and/or air conditioning installation.

* * * * *